UNITED STATES PATENT OFFICE.

HENRY HESS, OF PHILADELPHIA, PENNSYLVANIA.

SOLDERING-FLUX.

1,401,154.　　　Specification of Letters Patent.　　Patented Dec. 27, 1921.

No Drawing.　　Application filed January 11, 1919.　Serial No. 270,615.

*To all whom it may concern:*

Be it known that I, HENRY HESS, a citizen of the United States, residing at Philadelphia, in the county of Philadelphia and State of Pennsylvania, have invented certain new and useful Improvements in Soldering-Flux, of which the following is a specification.

This invention relates to a soldering flux of improved form and characteristics, designed to facilitate the application of solder metal to the surfaces to be united, and the invention consists in a soldering flux containing a suitable flux, and a small amount of metal, which metal in the soldering operation is adapted to form on the surfaces to be united, a very thin metal coating, and thus produce a superior surface to receive the solder.

My improved flux is preferably in the form of a compound containing a suitable vehicle or carrier, a flux, and a comparatively small amount of metal, the said ingredients being thoroughly intermingled and mixed together, and being of such proportional amounts as to give the mass a liquid or pasty form as desired. The vehicle or carrier may be vaseline in more or less amount, according to the desired consistency of the compound; the flux may be zinc chlorid or ammonium chlorid, or both; and the metal may be of powdered form and in small amount.

In making up the compound I prefer to employ 80% of vaseline as the vehicle, 13% of zinc chlorid, 2% of ammonium chlorid as the flux, and 5% of metal powder, for instance tin, these ingredients in the proportions mentioned producing a pasty compound or mass which may be conveniently put up for use in collapsible tubes or containers, the large proportion of vaseline facilitating the flow of the mass from the tubes when it is to be applied to the surfaces to be soldered.

It will be understood that the ingredients of my improved compound may be in other proportions than those above given without departing from the spirit of the invention, the essence of which resides in the employment in a soldering flux, of a proportionately small amount of metal, which in the soldering operation, when the heat is applied to melt the solder metal, will be precipitated or fused and will form a very thin coat or skin on the parts to be united, of nearly immeasurable thickness, thereby producing a surface well adapted to receive the soldering metal, and facilitating its application and union with the parts to be joined. The proportion of the metal in the improved flux is not great enough in amount to effect alone the connection or soldering of the parts, its only function being to form on said parts a superior surface to receive the solder metal, which may either be put down by a solid solder stick, or in the form of solder paste now well known in the art.

Also it will be understood that my invention is not limited to a vehicle or carrier in the form of vaseline, nor to a flux in the form of ammonium chlorid and zinc chlorid, although I prefer to employ these particular ingredients as being best adapted for the ends in view.

In the use of the improved flux, a small quantity of the same is spread over the surfaces to be united, and then the solder is applied to the surfaces thus coated, and finally heat is applied to melt the solder in the usual way, which heat will act to precipitate the metal content of the flux, slightly in advance of the melting of the solder, by which operation the precipitated metal content of the flux will form, as above described, a very thin metal coating of nearly immeasurable thickness, and will thus produce a surface to which the melted solder will readily unite.

Having thus described my invention, what I claim and desire to secure by Letters Patent of the United States is as follows:

1. As a new article of manufacture, a soldering flux containing an amount of metal sufficient only to form a metallic coating of nearly immeasurable thickness to receive and facilitate the application of solder.

2. As a new article of manufacture, a soldering flux in the form of a paste containing an amount of metal sufficient only to form by the application of heat, a metallic coating of nearly immeasurable thickness to receive and facilitate the application of solder.

3. As a new article of manufacture, a soldering flux compound comprising a suitable flux, a vehicle or carrier, and an amount of metal sufficient only to form, by the application of heat, a metallic coating of nearly immeasurable thickness to receive and facilitate the application of solder.

4. As a new article of manufacture, a soldering flux compound comprising a flux in the form of zinc chlorid, a vehicle or carrier in the form of vaseline, and an amount of metal powder sufficient only to form a metallic coating of nearly immeasurable thickness to receive and facilitate the application of solder.

5. As a new article of manufacture, a soldering flux compound in the form of a paste, comprising zinc chlorid, ammonium chlorid, and vaseline in substantially the proportions specified, and metal powder in a proportionate amount which, when the compound is subjected to heat, will fuse and form a metallic coating of immeasurable thickness to receive and facilitate the application of solder.

6. As a new article of manufacture, a soldering flux compound comprising 13% of zinc chlorid, 2% of ammonium chlorid, 80% of vaseline, and 5% of metal powder.

In testimony whereof, I have affixed my signature hereto.

HENRY HESS.